(12) United States Patent
Lin et al.

(10) Patent No.: US 11,603,883 B1
(45) Date of Patent: Mar. 14, 2023

(54) ROLLER-TYPE LINEAR GUIDEWAY

(71) Applicant: HIWIN TECHNOLOGIES CORP., Taichung (TW)

(72) Inventors: Guan-Ting Lin, Taichung (TW); Chao-Syuan Cai, Taichung (TW); Wen-Hao Yang, Taichung (TW); Bo-Han Huang, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 0 days.

(21) Appl. No.: 17/644,048

(22) Filed: Dec. 13, 2021

(51) Int. Cl.
    *F16C 29/06* (2006.01)
(52) U.S. Cl.
    CPC .................. *F16C 29/0609* (2013.01)
(58) Field of Classification Search
    CPC ... F16C 29/06; F16C 29/0602; F16C 29/0609
    See application file for complete search history.

(56) References Cited

U.S. PATENT DOCUMENTS 10,557,504 B1 *  2/2020  Jiang ................. F16C 19/522

FOREIGN PATENT DOCUMENTS

| DE | 102017118848 | * | 2/2019 |
| TW | I422762 B | | 1/2014 |
| WO | WO2018105893 | * | 6/2018 |

* cited by examiner

*Primary Examiner* — James Pilkington
(74) *Attorney, Agent, or Firm* — Wang Law Firm, Inc.

(57) ABSTRACT

A roller type linear guideway includes: a rail, a sliding block sleeved on the rail, and end cover units installed at two ends of the sliding block. One of the end cover units includes a first cover plate, a second cover plate, an open end cover, and an outer end cover. The first cover plate includes a plurality of penetrating holes communicating with the non-load passages, the second cover plate is installed on the first cover plate and includes holes connected to the penetrating holes, and the open end cover is installed on one end of the sliding block and includes through holes communicating with the holes. The outer end cover closes the through holes to allow circulation of multiple rolling elements. The through holes, the holes, and the penetrating holes are connected to the non-load passages, so four rows of rolling elements can be filled simultaneously.

10 Claims, 17 Drawing Sheets

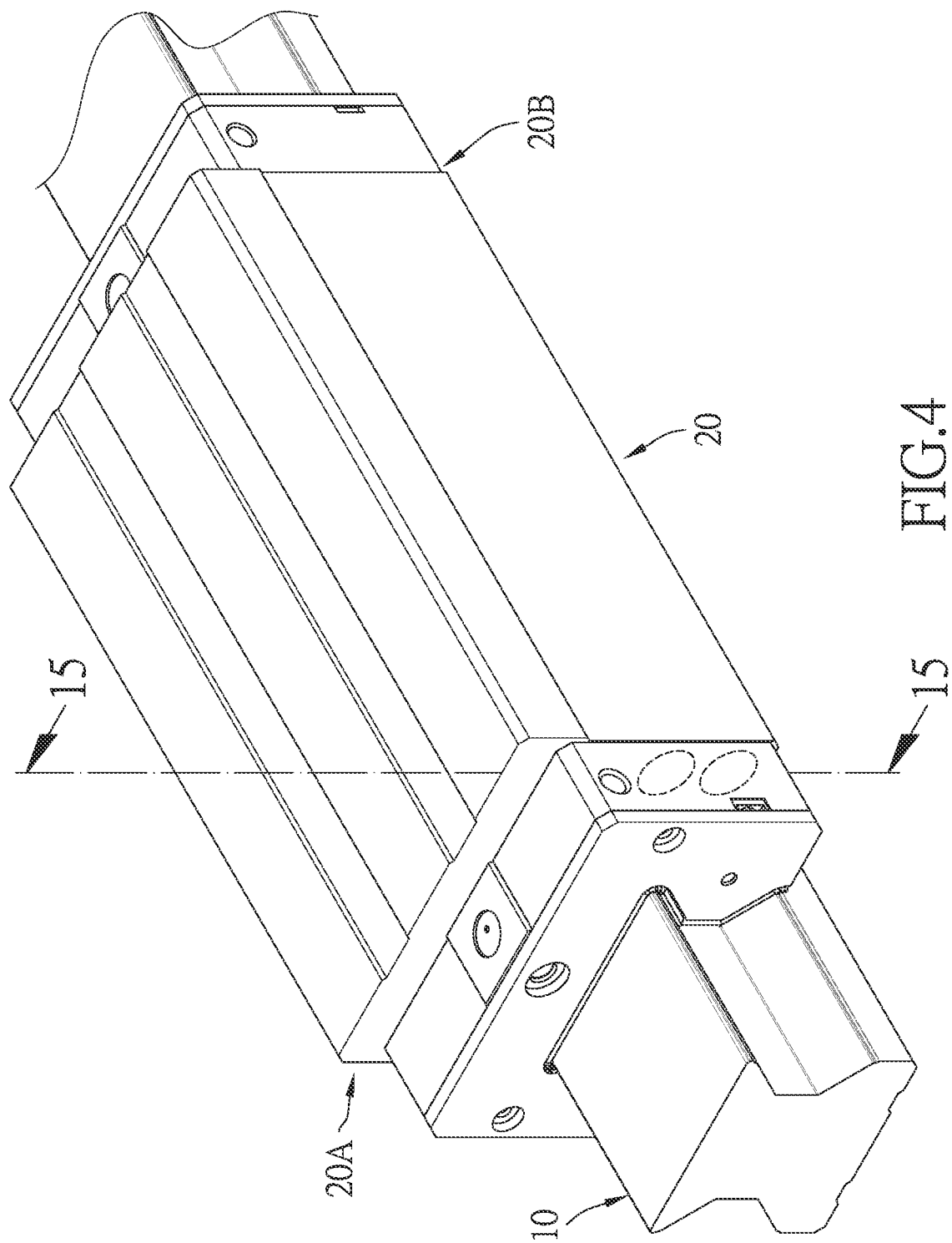

US 11,603,883 B1

ROLLER-TYPE LINEAR GUIDEWAY

BACKGROUND

Field of the Invention

The present invention relates to a linear guideway, and more particularly to a roller-type linear guideway.

Description of Related Art

The return system of linear guideways generally includes rolling elements, return channels, and return assemblies, etc., while the return systems of linear guideways are roughly classified into a combination of independent parts and a method of integral molding.

For the return system which is a combination of independent parts, please refer to the Taiwan patent No. TWI422762, as shown in FIGS. 1A-1B, wherein the first return path R1 of this design is formed by the first return pipe 91, the first return portion 92, and the first passage 93, and the rollers W installed in the first return path R1 are fed in through a first roller hole 911 which is in communication with the first return pipe 91. Referring then to FIGS. 2A-2B, a cover plate J is covered outside the first return pipe 91, and the turning portion J1 of the cover plate J completely closes the first roller hole 911. After covering the cover plate J, as shown in FIGS. 3A-3B, the second return pipe 97, the second return portion 98, and the return part J2 of the cover plate J form a second return path R2. The return part J2 is formed with a second roller hole J21, and the rollers W are fed into the second return path R2 through the second roller hole J21.

However, when this design is assembled, it is necessary to fill two rows of rollers W into the first return path R1 first, and then close the first roller hole 911 with the cover plate J before filling another two rows of rollers W through the second roller hole J21, and finally installs the end caps. This will cause the problem of not being able to fill four rows of rollers simultaneously, which will increase the assembly process and extend the assembly time.

SUMMARY

The present invention is to provide a roller-type linear guideway, the main objective of which is to solve the problem that four rows of rollers cannot be assembled on the same side of the slide block at a time, resulting in poor assembly efficiency.

To achieve the above objective, a roller-type linear guideway in accordance with the invention comprises:

a rail;

a sliding block slidably sleeved on the rail and including a plurality of non-load passages, wherein the sliding block and the rail jointly form a plurality of load passages;

two end cover units disposed at two ends of the sliding block, wherein the two end cover units together with the plurality of non-load passages and the plurality of load passages form a circulation path for a plurality of rolling elements to circulate, wherein one of the end cover units comprises:

a first cover plate is disposed on the sliding block and includes a plurality of penetrating holes in communication with the non-load passages;

a second cover plate disposed on a surface of the first cover plate facing away from the sliding block, a first turning path is formed between the second cover plate and the first cover plate and is in communication with the non-load passages and the load passages, and the second cover plate includes a plurality of holes which are respectively in communication with the penetrating holes of the first cover plate;

an open end cover disposed at one end of the sliding block and located at one side of the second cover plate facing away from the first cover plate, a second turning path is formed between the open end cover and the second cover plate, an angle is formed between an extending direction of the second turning path and an extending direction of the first turning path, and the open end cover includes a plurality of through holes respectively communicating with the holes; and an outer end cover is installed on the open end cover and closes the through holes.

It can be learn from the above that the through holes of the open end covers, the holes of the second cover plates, and the penetrating holes of the first cover plates are connected to the non-load passages. Therefore, the rolling elements can be directly fed into the non-load passages through the through holes, the holes, and the penetrating holes, so that four rows of rolling elements can be fed at the same time, without turning over or feeding the rolling elements separately, which can greatly reduce assembly man-hours and increase the possibility of automation.

BRIEF DESCRIPTION OF THE DRAWINGS

FIG. 4 is a perspective view of this invention;

DETAILED DESCRIPTION

Figure 1B:
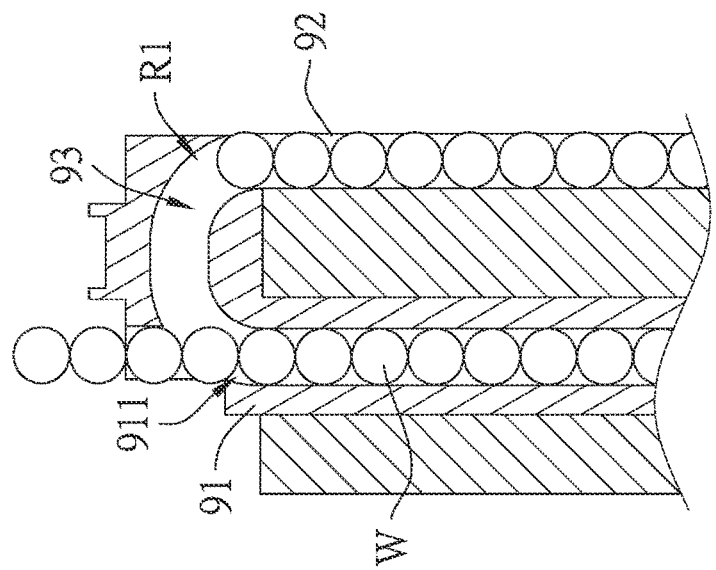
FIG. 1B is a cross-sectional view of FIG. 1A.
Figure 1A:
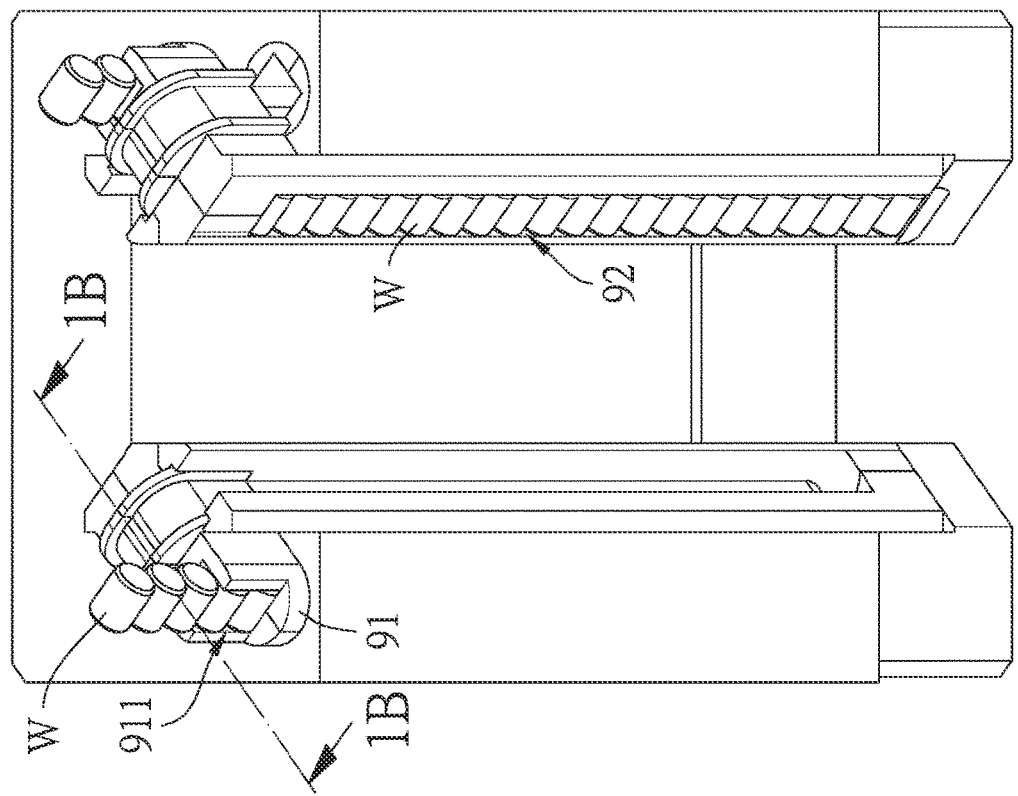
FIG. 1A is a schematic diagram of the conventional roller-type linear guideway showing that rollers are loaded in the first return path.
Figure 2B:
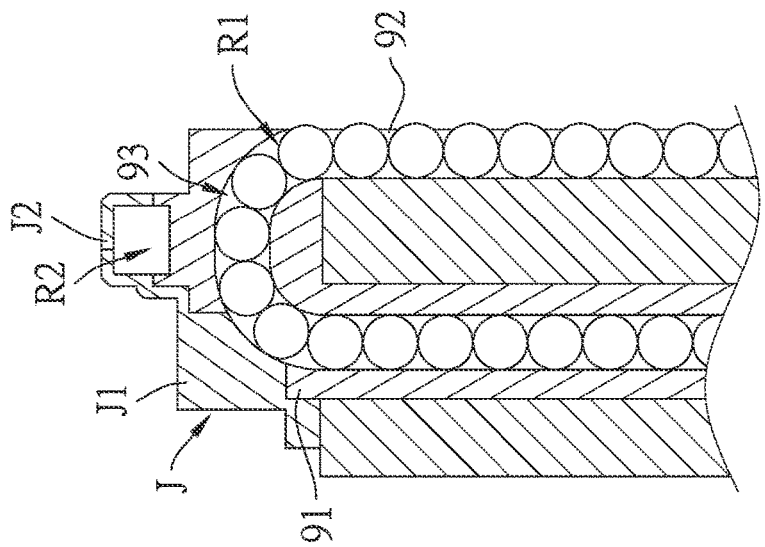
FIG. 2B is a cross-sectional view of FIG. 2A.
Figure 2A:
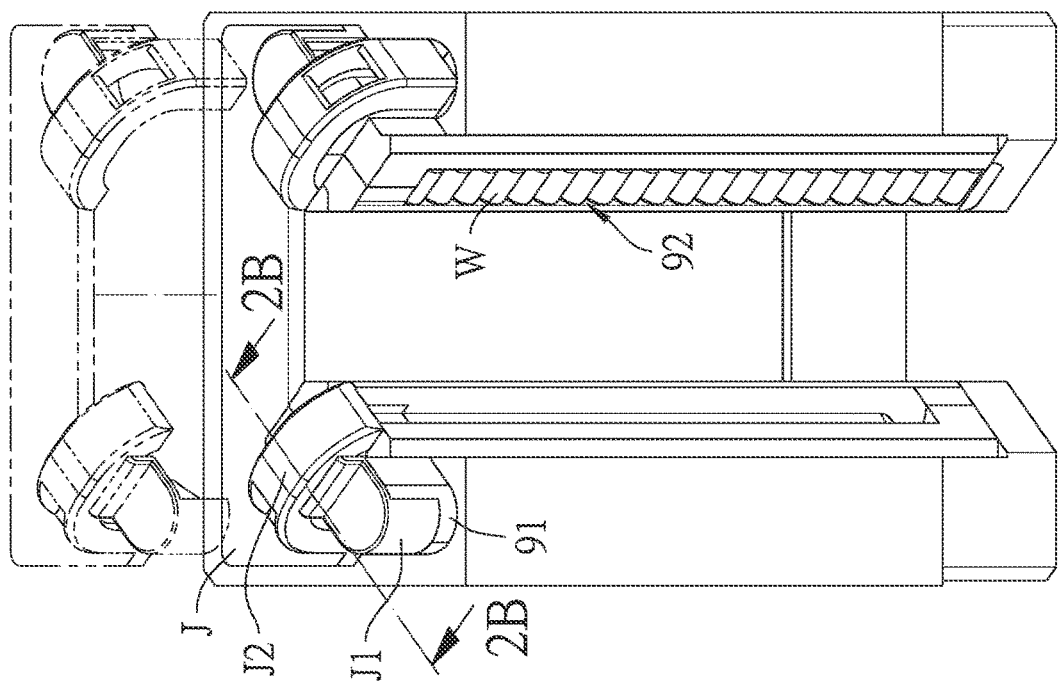
FIG. 2A is a schematic diagram showing that the cover plate is assembled to the conventional roller-type linear guideway.
Figure 3B:
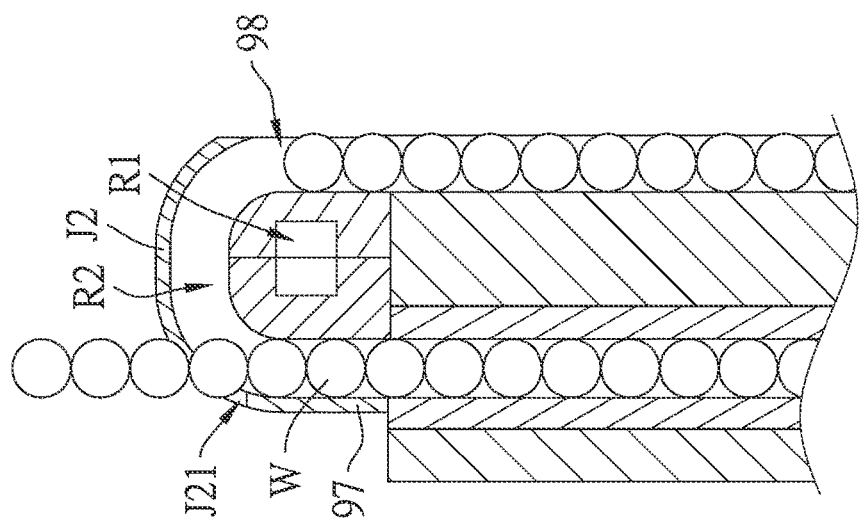
FIG. 3B is a cross-sectional view of FIG. 3A.
Figure 3A:
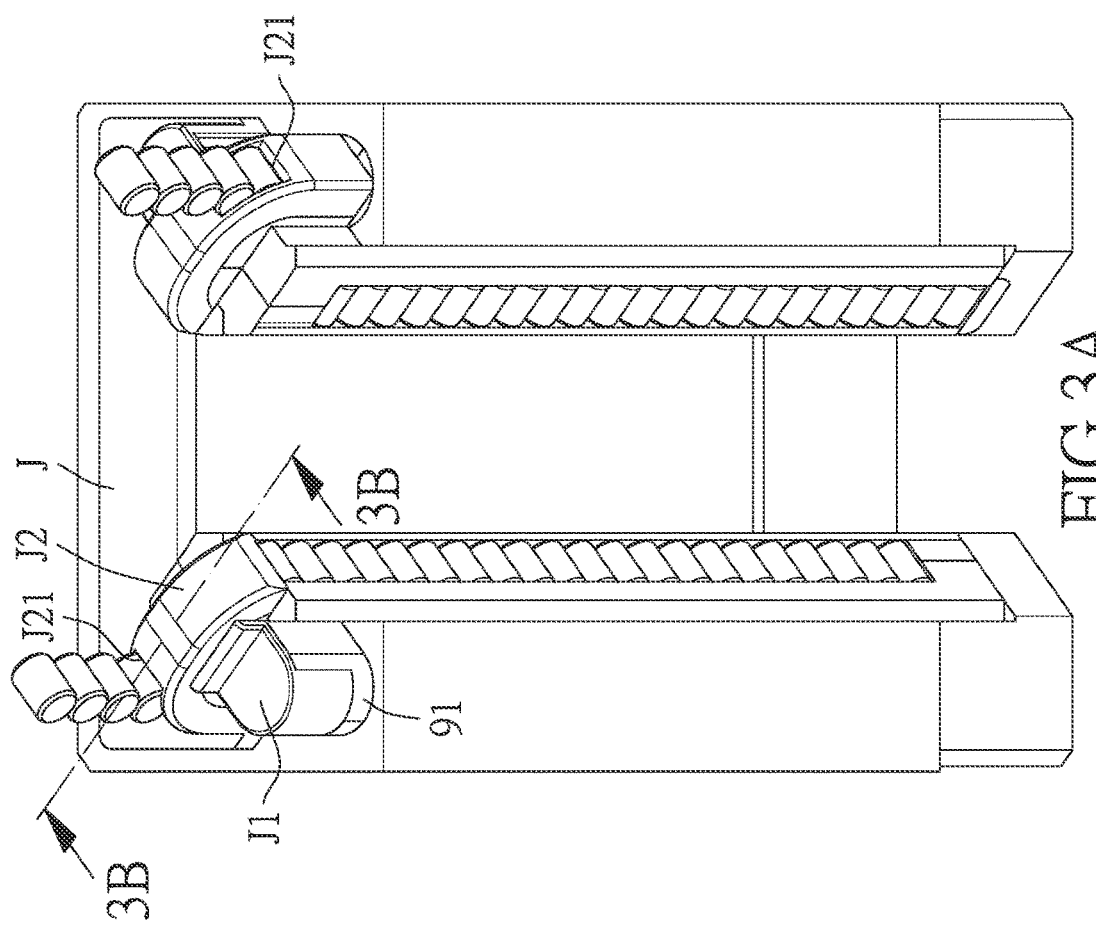
FIG. 3A is a schematic diagram of the conventional roller-type linear guideway showing that the rollers are being loaded in the second return path.

The present invention provides a roller-type linear guideway, and one of the embodiments as shown in FIGS. 4-16 comprises the following components:

A rail 10, a sliding block 20, and two end cover units Q. The two end cover units Q are respectively disposed at two ends of the sliding block 20. One of the end cover units Q includes a first cover plate 40, a second cover plate 50, an open end cover 60, an outer end cover 70, the other end cover unit Q includes a first cover plate 40, a second cover plate 50 and a closed end cover 80.

The rail 10 is an elongated member, and the outer peripheral surface of the rail 10 includes a first rolling groove 11, a second rolling groove 12, a third rolling groove 13, and a fourth rolling groove 14.

The sliding block 20 is slidably sleeved on the rail 10 along a sliding direction X. The sliding block 20 is provided with four non-load passages 21 along the sliding direction X. The non-load passages 21 are defined as a first non-load passage 211, a second non-load passage 212, a third non-load passage 213, and a fourth non-load passage 214. The first non-load passage 211 is adjacent to the second non-load passage 212 and located on one side of the sliding block 20, and the third non-load passage 213 is adjacent to the fourth non-load passage 214 and located on the other side of the sliding block 20. The sliding block 20 includes a first rolling surface 221, a second rolling surface 222, a third rolling surface 223, and a fourth rolling surface 224 along the sliding direction X. The sliding block 20 defines a first end 20A and a second end 20B along the sliding direction X.

The sliding block 20 and the rail 10 jointly form four load passages T, which are defined as a first load passage T1, a second load passage T2, a third load passage T3, and a fourth load passage T4. The first rolling groove 11 and the first rolling surface 221 jointly form the first load passage T1, the second rolling groove 12 and the second rolling surface 222 jointly form the second load passage T2, the third rolling groove 13 and the third rolling surface 223 jointly form the third load passage T3, and the fourth rolling groove 14 and the fourth rolling surface 224 jointly form the fourth load passage T4.

Preferably, the invention further includes two cages 30, the two cages 30 are installed on the sliding block 20 to hold a plurality of rolling elements R. One of the cages 30 faces the first rolling surface 221 and the second rolling surface 222, and the other cage 30 faces the third rolling surface 223 and the fourth rolling surface 224.

Figure 5:
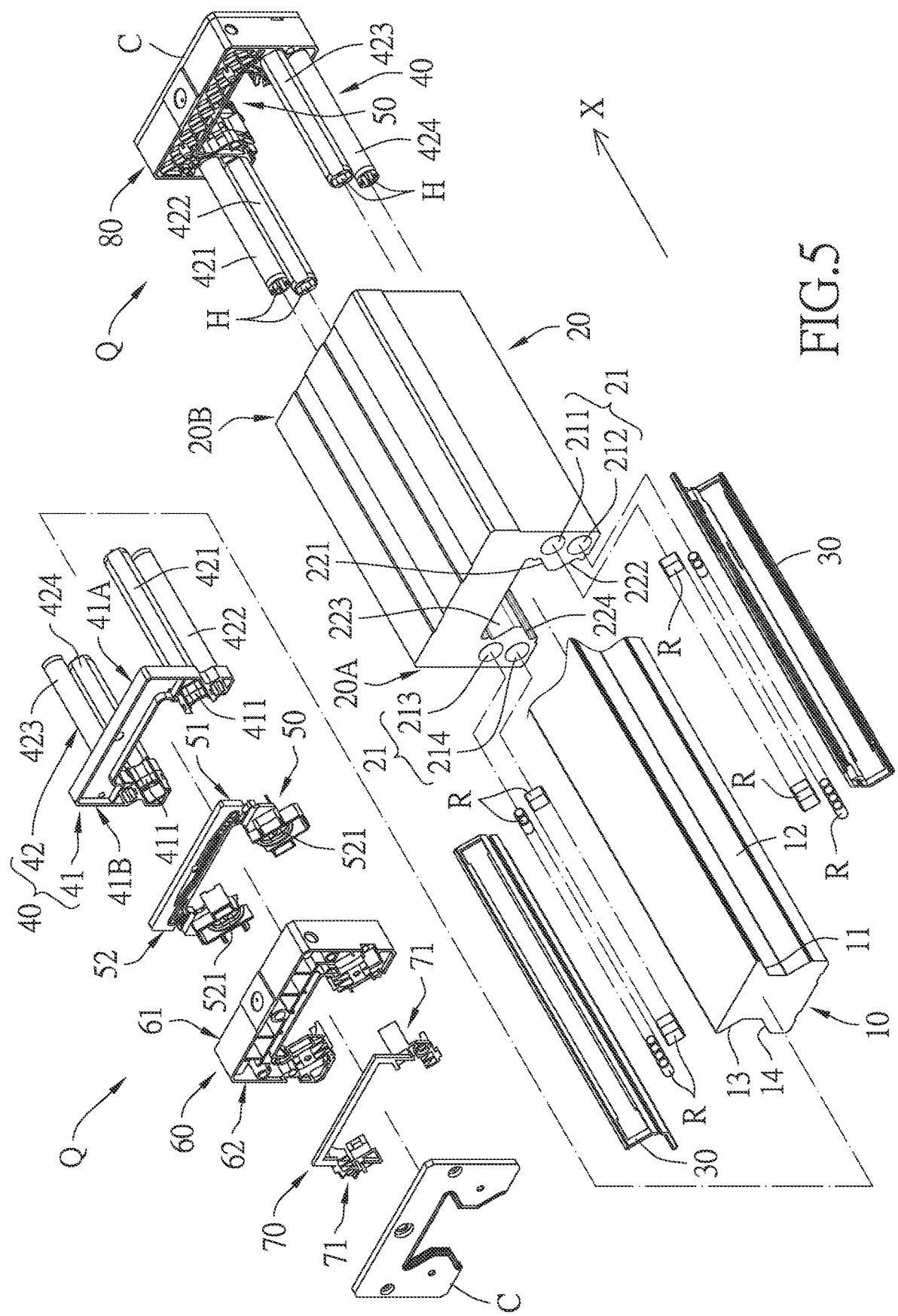
FIG. 5 is an exploded view of this invention.
Figure 6:
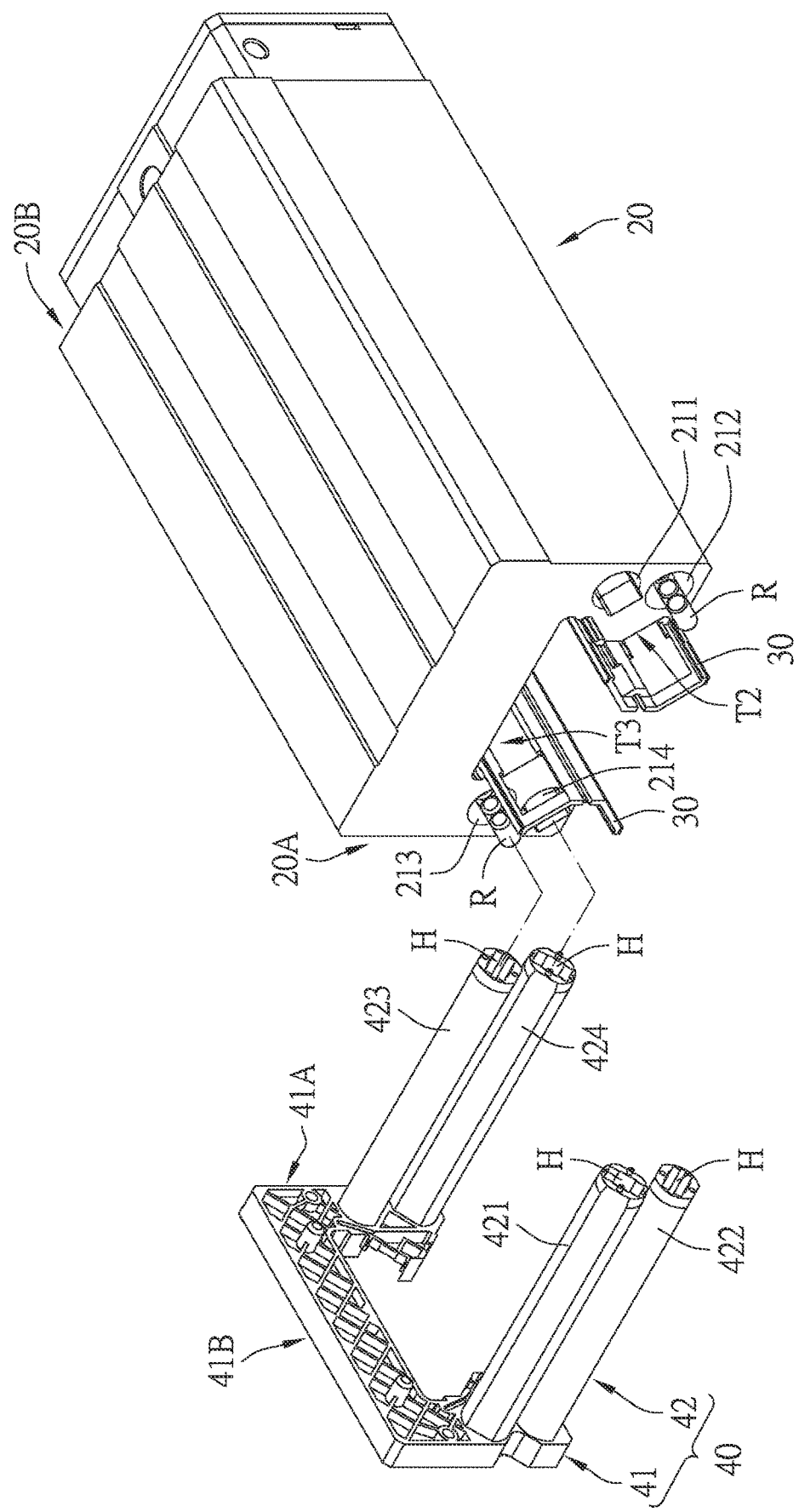
FIG. 6 is a perspective view of this invention, showing the first cover plate and the sliding block.
Figure 7:
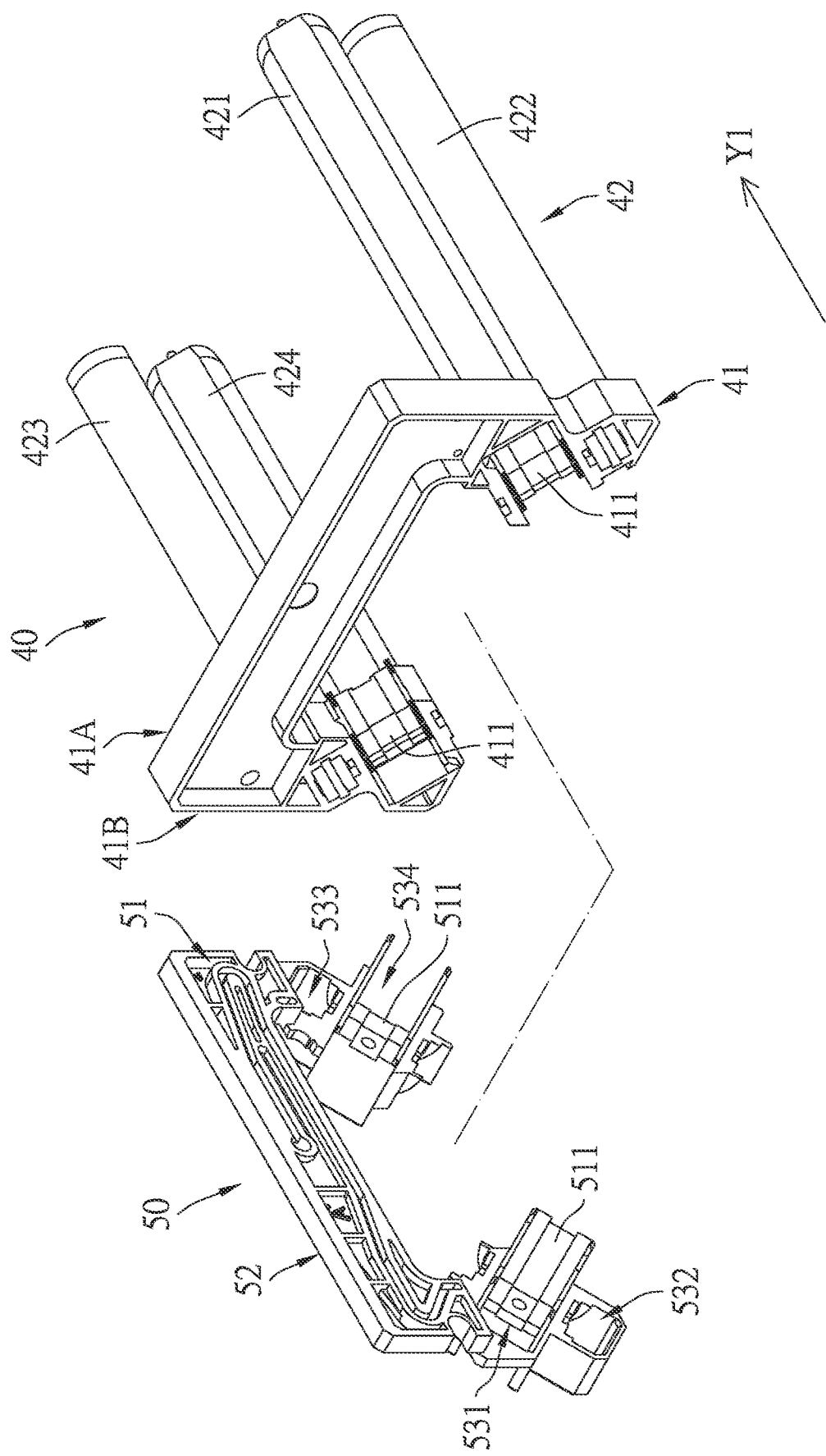
FIG. 7 is a perspective view of the invention, showing the first cover from another angle of view and the second cover.

As shown in FIGS. 5-7, the first cover plates 40 each include a main body 41 and four return pipes 42 connected to the main body 41. The return pipes 42 each include a penetrating hole H which penetrates the main body 41. One of the first cover plates 40 is disposed at the first end 20A of the sliding block 20, and the other first cover plate 40 is disposed at the second end 20B of the sliding block 20. The main body 41 includes an inner surface 41A and an outer surface 41B opposite to each other along the sliding direction X. The return pipes 42 are connected to the inner surface 41A. The return pipes 42 are defined as a first return pipe 421 and a second return pipe 422, a third return pipe 423, and a fourth return pipe 424. The first return pipe 421 of the first cover plate 40 at the first end 20A is inserted into the first non-load passage 211, the second return pipe 422 of the first cover plate 40 at the first end 20A is inserted in the second non-load passage 212, the third return pipe 423 of the first cover plate 40 at the first end 20A is inserted in the third non-load passage 213, and the fourth return pipe 424 of the first cover plate 40 at the first end 20A is inserted in the fourth non-load passage 214. The first return pipe 421 of the first cover plate 40 at the second end 20B is inserted into the third non-load passage 213 and connected to the third return pipe 423 of the other first cover plate 40, the second return pipe 422 of the first cover plate 40 at the second end 20B is inserted into the fourth non-load passage 214 and is connected to the fourth return pipe 424 of the other first cover plate 40, the third return pipe 423 of the first cover plate 40 at the second end 20B is inserted into the first non-load passage 211 and connected to the first return pipe 421 of the other first cover plate 40, and the fourth return pipe 424 of the first cover plate 40 at the second end 20B is inserted into the second non-load passage 212 and connected to the second return pipe 422 of the other first cover plate 40, so that the penetrating holes H of the return pipes 42 are connected to each other, and the penetrating holes H are provided for accommodating the rolling elements R.

The outer surface 41B of each main body 41 includes two first turning portions 411, the two first turning portions 411 extend along a first turning direction Y1, one of the first turning portions 411 is connected to the first return pipe 421, and the other first turning portion 411 is connected to the fourth return pipe 424.

As shown in FIGS. 5 and 7, each of the second cover plates 50 is disposed on the outer surface 41B of a corresponding one of the first cover plates 40, and each of the second cover plates 50 includes an inner corresponding side 51 and an outer corresponding side 52 opposite to each other along the sliding direction X. The inner corresponding side 51 includes two first turning surfaces 511 which are arc surfaces and extend along the first turning direction Y1. Each of the first turning surfaces 511 faces a corresponding one of the first turning portions 411 to form a first turning path K1.

Figure 10:
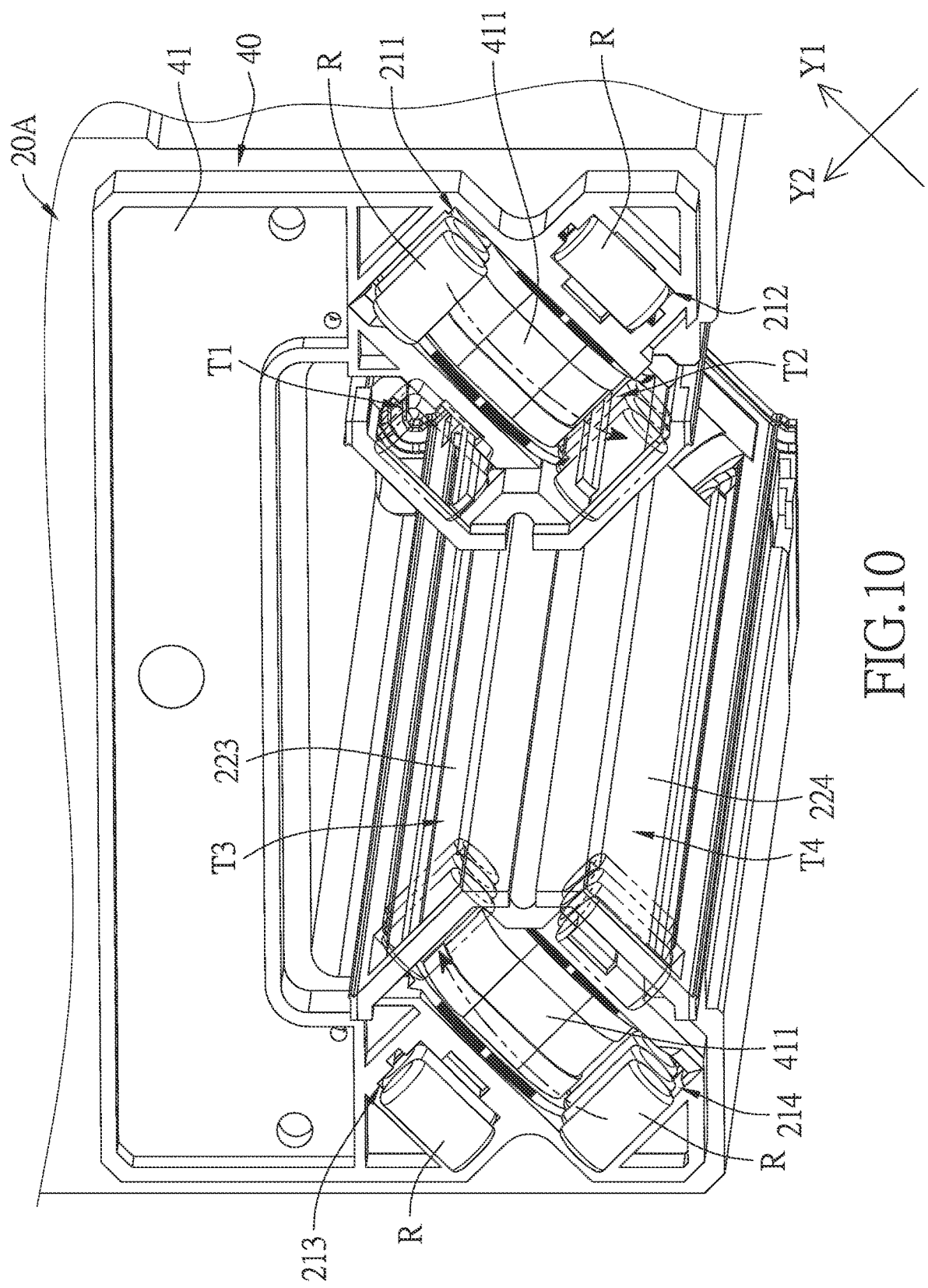
FIG. 10 is a schematic view of the invention showing the first cover installed on the sliding block.
Figure 11:
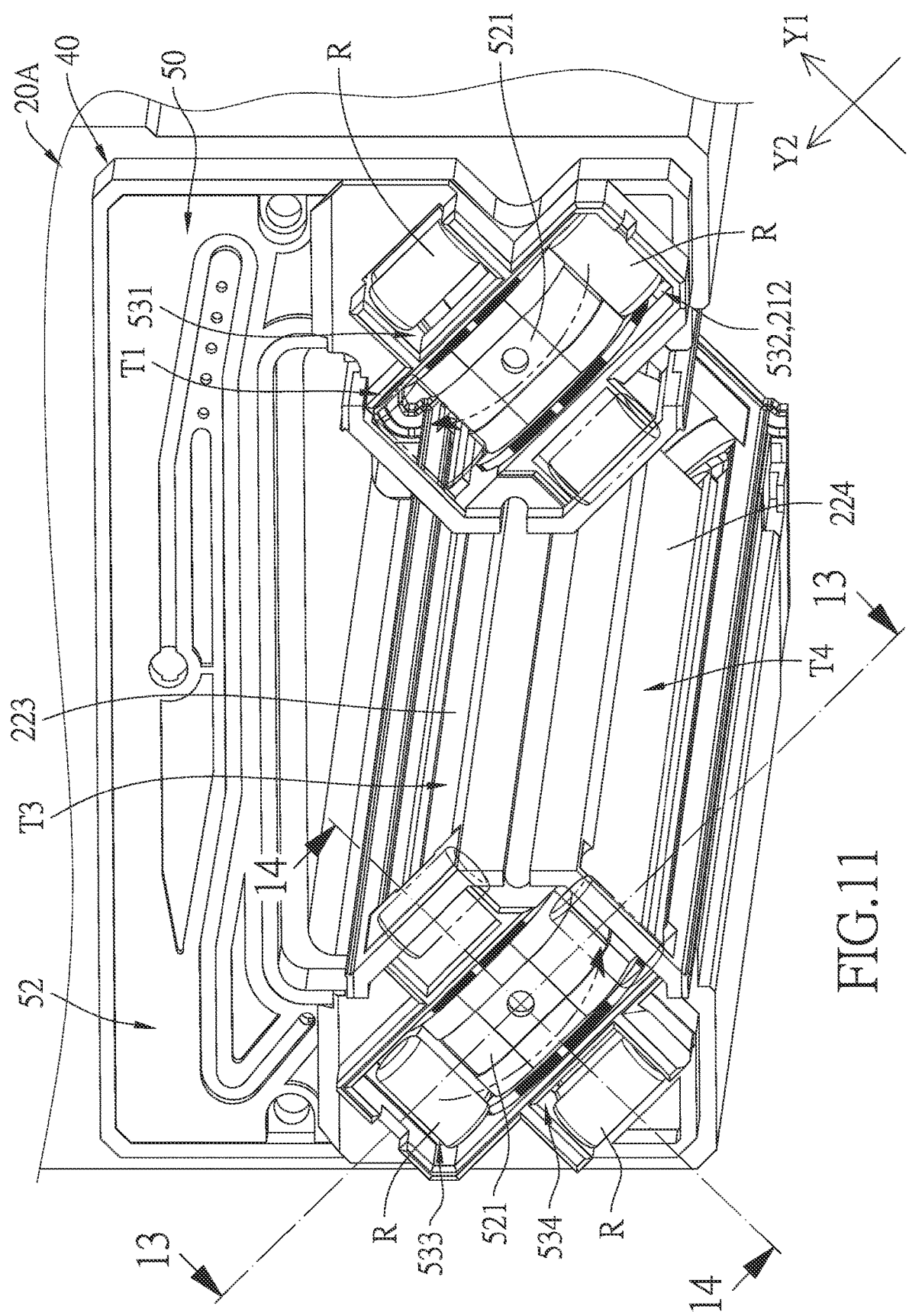
FIG. 11 is a schematic view of the invention showing the second cover plate installed outside the first cover plate.
Figure 15:
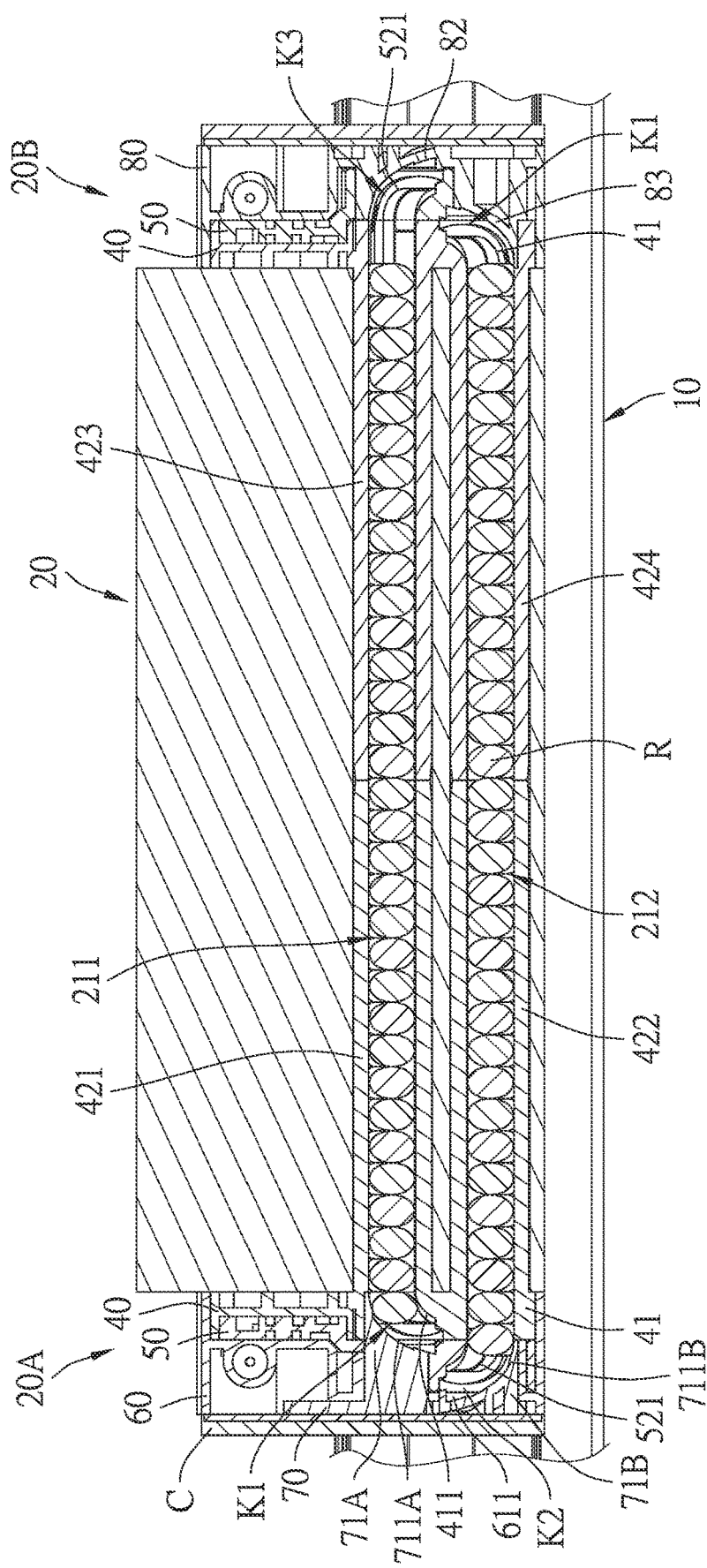
FIG. 15 is a cross-sectional view taken along line 15-15 in FIG. 4.

Please refer to FIGS. 10 and 15, one of the first turning paths K1 at the first end 20A is connected to the first non-load passage 211 and the second load passage T2, and the other of the first turning paths K1 is connected to the fourth non-load passage 214 and the third load passage T3. One of the first turning paths K1 at the second end 20B is connected to the second non-load passage 212 and the first load passage T1, and the other of the first turning paths K1 is connected to the third non-load passage 213 and the fourth load passage T4.

Please refer to FIG. 7, each of the second cover plates 50 includes four holes 53 which are a first hole 531, a second hole 532, a third hole 533, and a fourth hole 534 respectively. The position of the first hole 531 corresponds to the first non-load passage 211, the position of the second hole 532 corresponds to the second non-load passage 212, and the position of the third hole 533 corresponds to the third non-load passage 213, and the position of the fourth hole 534 corresponds to the fourth non-load passage 214. Please refer to FIG. 8, the outer corresponding side 52 includes two second turning portions 521, and the two second turning portions 521 extend along a second turning direction Y2. There is an angle between the second turning direction Y2 and the first turning direction Y1. Preferably, the second turning direction Y2 is perpendicular to the first turning direction Y1.

Figure 8:
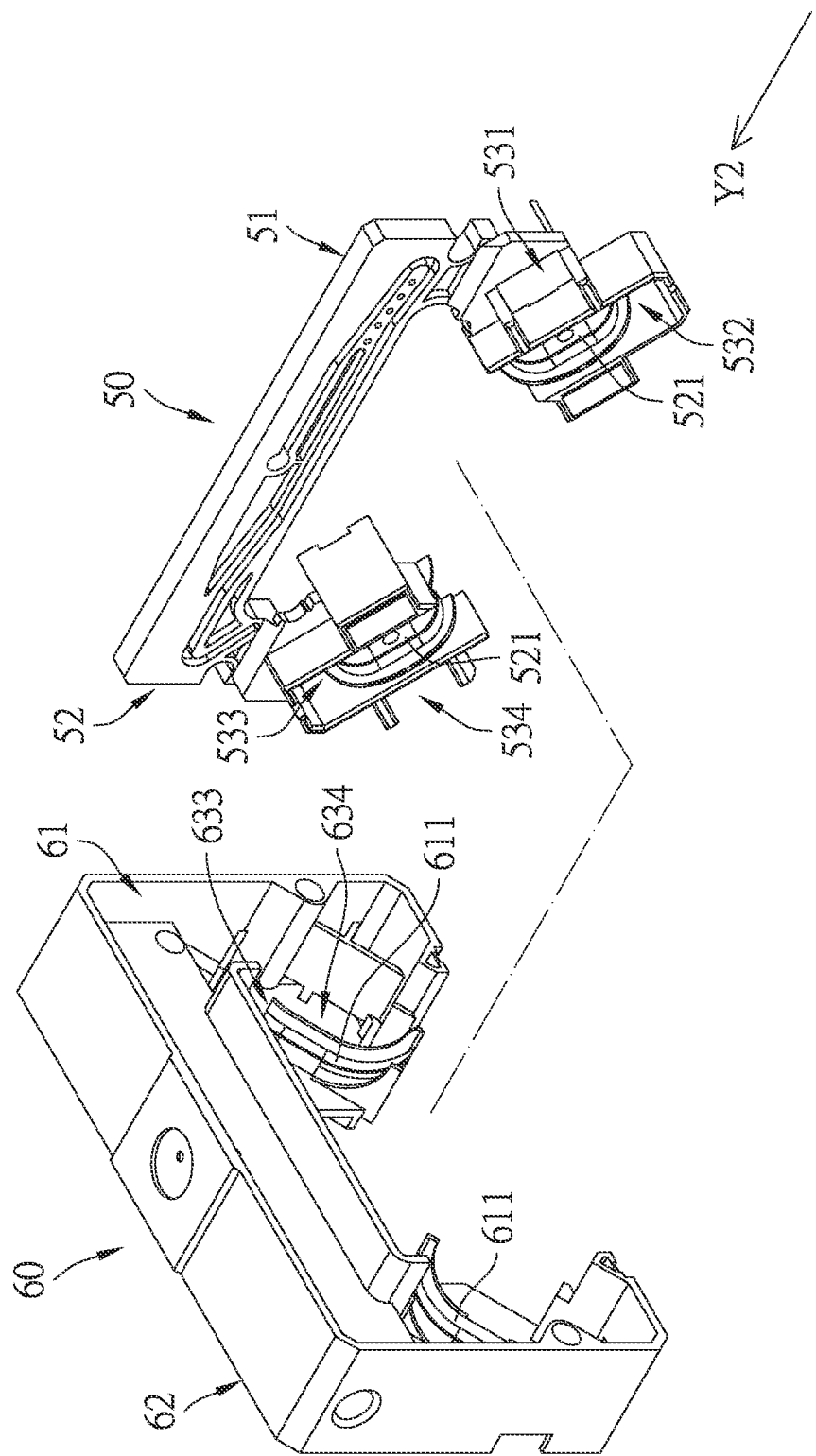
FIG. 8 is a perspective view of the invention, showing the second cover from another angle of view and the open end cover.
Figure 9:
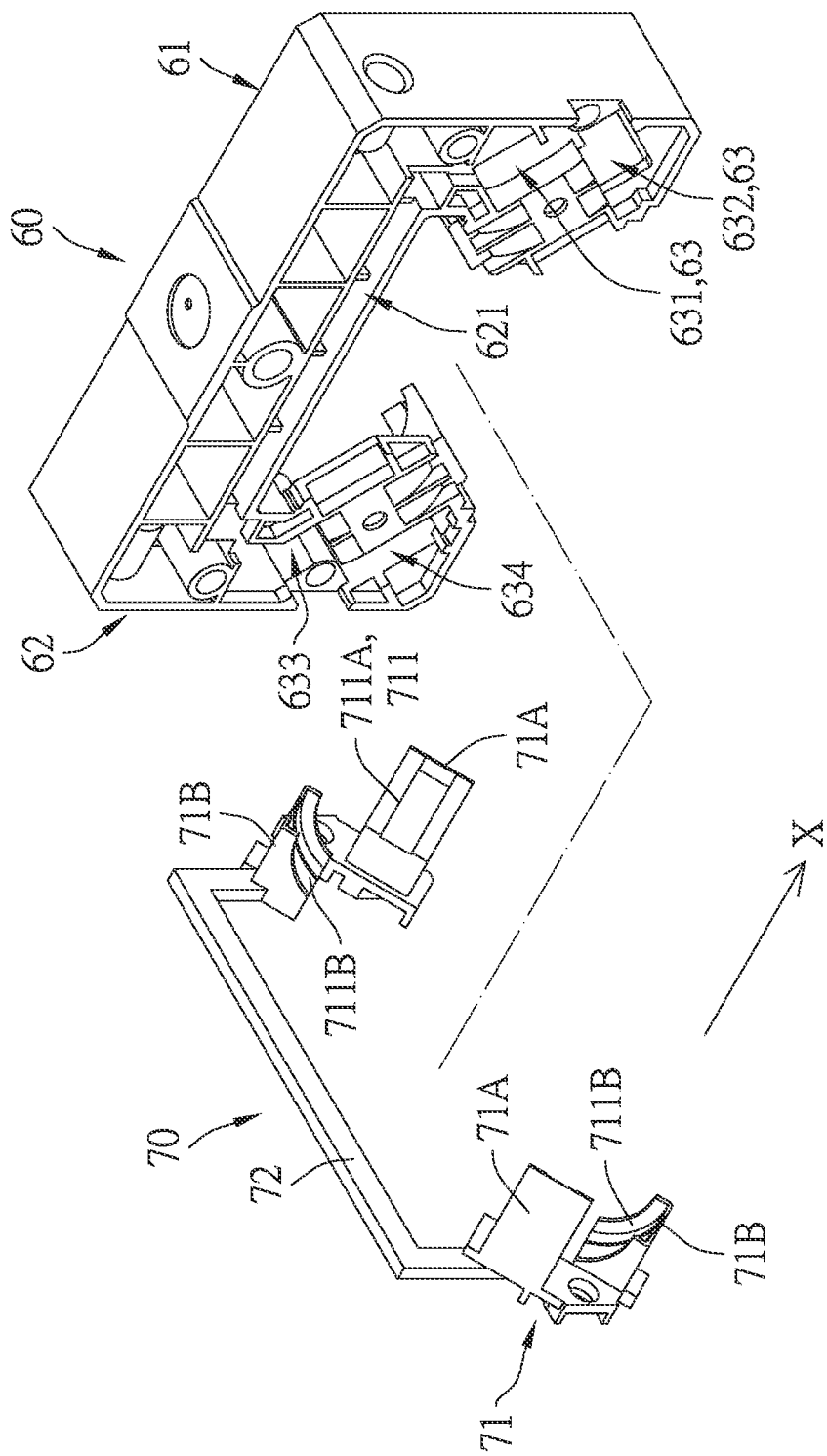
FIG. 9 is a perspective view of this invention, showing the open end cover from another angle of view and the outer end cover.

As shown in FIGS. 5, 8, and 9, the open end cover 60 covers the first cover plate 40 and the second cover plate 50, and is located at the first end 20A of the sliding block 20. The open end cover 60 includes a first side 61 and a second side 62 opposite to each other along the sliding direction X. The first side 61 faces the second cover plate 50, and the second side 62 faces away from the second cover plate 50. The first side 61 includes two second turning surfaces 611 which are arc surfaces and extend along the second turning direction Y2. Each of the second turning surfaces 611 faces a corresponding one of the second turning portions 521 to form a second turning path K2. Please refer to FIG. 15, the positions of the second turning paths K2 in the sliding direction X are different from the positions of the first turning paths K1 in the sliding direction X, and the first turning paths K1 are closer to the sliding block 20 than the second turning paths K2. One of the second turning paths K2 is connected to the second non-load passage 212 and the first load passage T1, and the other second turning path K2 is connected to the third non-load passage 213 and the fourth load passage T4. Preferably, the extending direction of the second turning path K2 is perpendicular to the extending direction of the first turning path K1.

Please refer to FIGS. 8 and 9, the open end cover 60 includes four through holes 63 which are respectively a first through hole 631, a second through hole 632, a third through hole 633 and a fourth through hole 634. The position of the first through hole 631 corresponds to the first hole 531, the position of the second through hole 632 corresponds to the second hole 532, the position of the third through hole 633 corresponds to the third hole 533, and the position of the fourth through hole 634 corresponds to the fourth hole 534. The second side 62 includes an accommodating groove 621.

As shown in FIG. 9, the outer end cover 70 includes four shielding portions 71 for closing the first through hole 631, the second through hole 632, the third through hole 633 and the fourth through hole 634, respectively. A connecting portion 72 is connected between two of the shielding portions 71 and the other two shielding portions 71, and the connecting portion 72 is accommodated in the accommodating groove 621. In this embodiment, the shielding portions 71 are protrusions and extend along the sliding direction X. Each of the shielding portions 71 includes a guide surface 711. The guide surfaces 711 are arc surfaces, the guide surfaces 711 constitute side wall of the first turning path K1 or the second turning path K2, and the guide surfaces 711 are provided for guiding the rolling elements R to change moving directions.

In a preferred embodiment, referring to FIGS. 9 and 15, the shielding portions 71 can be further divided into two first shielding portions 71A and two second shielding portions 71B. The two first shielding portions 71A close the first through hole 631 and the fourth through hole 634, and the two second shielding portions 71B close the second through hole 632 and the third through hole 633. The length of the first shielding portions 71A along the sliding direction X is greater than the length of the second shielding portions 71B along the sliding direction X. The guide surface 711 of each of the two first shielding portions 71A is a first guide surface 711A, the first guide surfaces 711A are side walls of the first turning paths K1, and the guide surface 711 of each of the two second shielding portions 71B is a second guide surface 711B, and the second guide surfaces 711B are side walls of the second turning paths K2.

Figure 16:
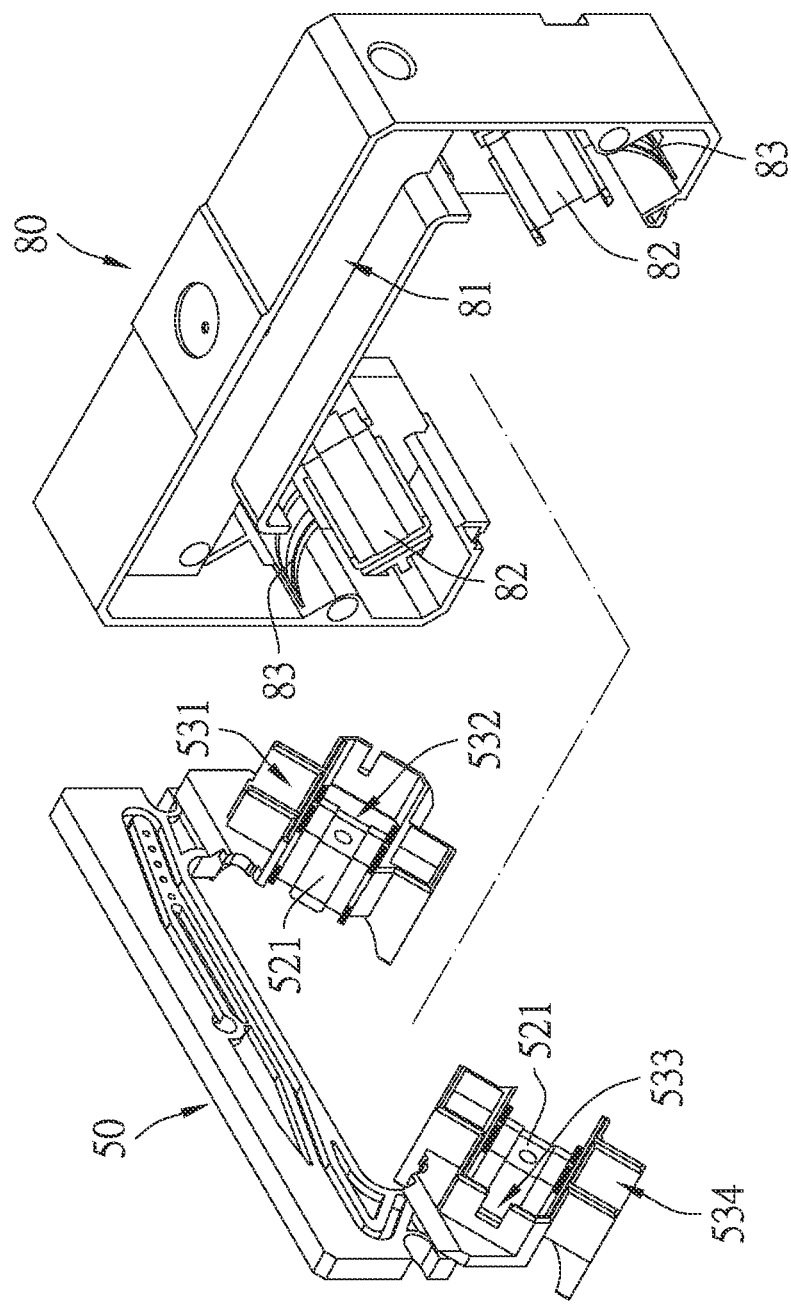
FIG. 16 is a perspective view of a second cover plate and a closed end cover installed on the second end of the sliding block.

As shown in FIGS. 5 and 16, the closed end cover 80 covers the first cover plate 40 and the second cover plate 50, and is located at the second end 20B of the sliding block 20. The closed end cover 80 includes a closed inner surface 81 facing the second cover plate 50, and the closed inner surface 81 includes two curved portions 82 extending along the second turning direction Y2. Each of the curved portions 82 faces a corresponding one of the second turning portions 521 to form a third turning path K3 with the second turning portions 521. Please refer to FIG. 15, the positions of the third turning paths K3 in the sliding direction X are different from the positions of the first turning paths K1 in the sliding direction X, the first turning paths K1 are closer to the sliding block 20 than the third turning paths K3. One of the third turning paths K3 is connected to the first non-load passage 211 and the second load passage T2, and the other third turning path K3 is connected to the fourth non-load passage 214 and the third load passage T3. The closed inner surface 81 further includes two closed convex portions 83, one of the closed convex portions 83 closes the first hole 531, and the other closed convex portion 83 closes the fourth hole 534.

Preferably, please refer to FIG. 5, the invention further includes two fixing members C, one of the fixing members C is locked on the open end cover 60, so that the outer end cover 70 is located between the fixing member C and the open end cover 60, and the other fixing member C is locked on the closed end cover 80 to fix the closed end cover 80.

Figure 17:
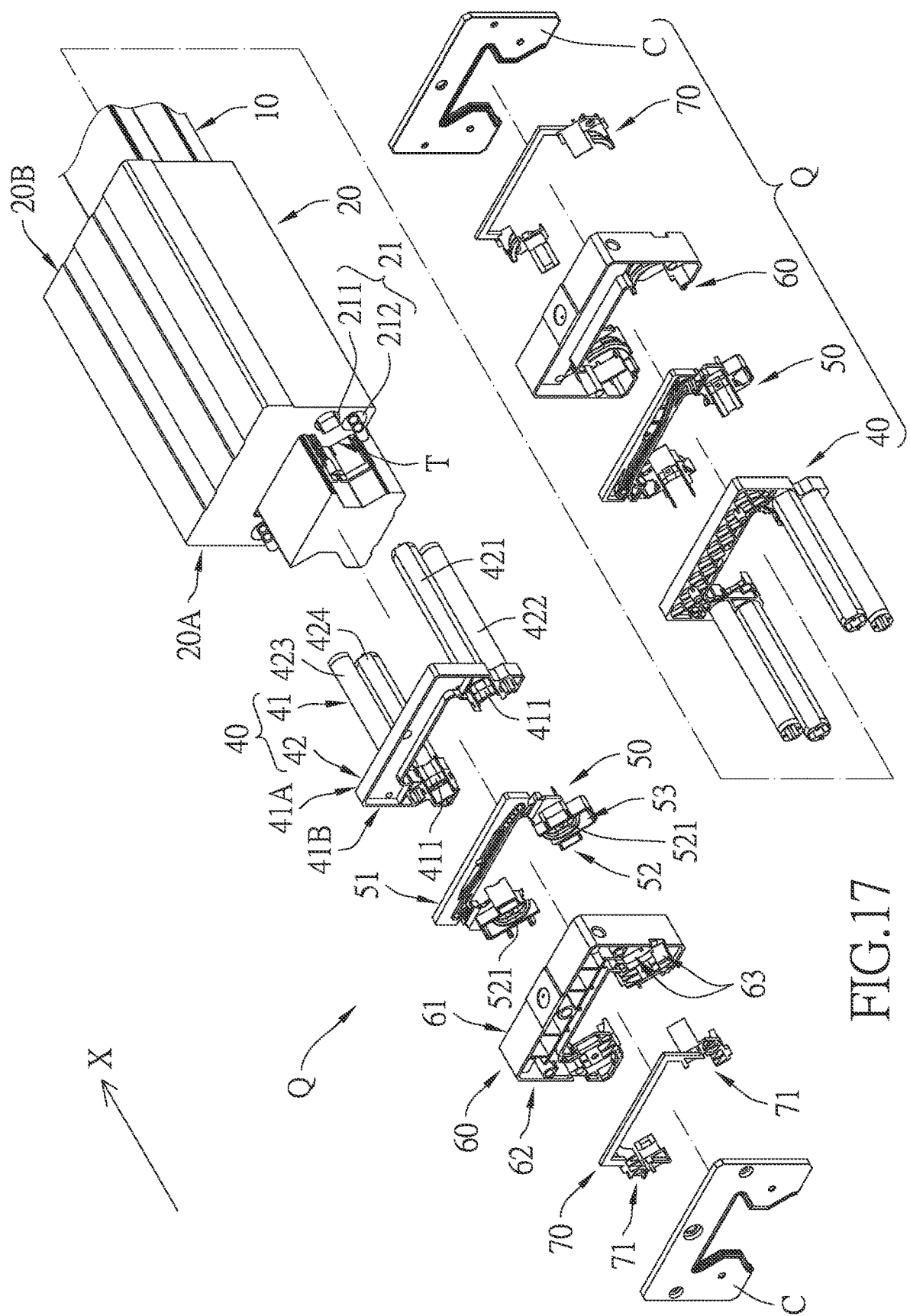
FIG. 17 is an exploded view of another embodiment of this invention.

In another embodiment of this invention, please refer to FIG. 17, the invention comprises the following components:

A rail 10, a sliding block 20, and two end cover units Q. The two end cover units Q are respectively disposed at two ends of the sliding block 20. Each of the end cover units Q includes a first cover plate 40, a second cover plate 50, an open end cover 60, and an outer end cover 70.

The sliding block 20 is slidably sleeved on the rail 10 and includes a plurality of non-load passages 21, and the sliding block 20 and the rail 10 jointly form a plurality of load passages T. The sliding block 20 defines the first end 20A and the second end 20B along the sliding direction X.

The first cover plates 40 are respectively installed on the first end 20A and the second end 20B of the sliding block 20, and the first cover plate 40 includes a plurality of penetrating holes H in communication with the non-load passages 21.

The second cover plates 50 are respectively mounted on the first end 20A and the second end 20B of the sliding block 20, and each of the second cover plates 50 is mounted on a surface of a corresponding one of the first cover plates 40 facing away from the sliding block 20, and each of the first turning paths K1 is formed between each of the second cover plates 50 and the corresponding one of the first cover plates 40. The first turning paths K1 are in communication with the load passages T and the non-load passages 21. The second cover plates 50 each include a plurality of holes 53 respectively connected to the penetrating holes H of the first cover plates 40.

Two open end covers 60 are respectively installed at the first end 20A and the second end 20B of the sliding block 20, each of the open end covers 60 is located on one side of a corresponding one of the second cover plates 50 facing away from the first cover plates 40. Each of the second turning paths K2 is formed between a corresponding one of the open end covers 60 and a corresponding one of the second cover plates 50. An angle is formed between the extending direction of each of the second turning paths K2 and the extending direction of a corresponding one of the first turning paths K1, and the open end cover 60 includes a plurality of through holes 63 respectively communicating with the holes 53.

Two outer end covers 70 are respectively installed on the open end covers 60 and close the through holes 63.

The above is the configuration description of the main components of each embodiment of this invention. As for the operation manner and effect of this invention, the description is as follows:

Please refer to FIGS. 10 and 15, when the rolling elements R move, they can move from the first non-load passage 211 to the first end 20A, and move through the first turning path K1 to the second load passage T2. After that, the rolling elements R move to the second end 20B and then enter the first non-load passage 211 again through the third turning path K3; please refer to FIGS. 11 and 15, the rolling elements R located in the second non-load passage 212 move to the first end 20A, and move to the first load passage T1 through the second turning path K2, after that, the rolling elements A move to the second end 20B and then enter the second non-load passage 212 again through the first turning path K1; and the circulation mode of the rolling elements R in the third load passage T3, the fourth load passage T4, the third non-load passage 213, and the fourth non-load passage 214 is the same as that in the first load passage T1, the second load passage T2, the first non-load passage 211 and the second non-load passage 212, so it will not be described in detail.

Figure 12:
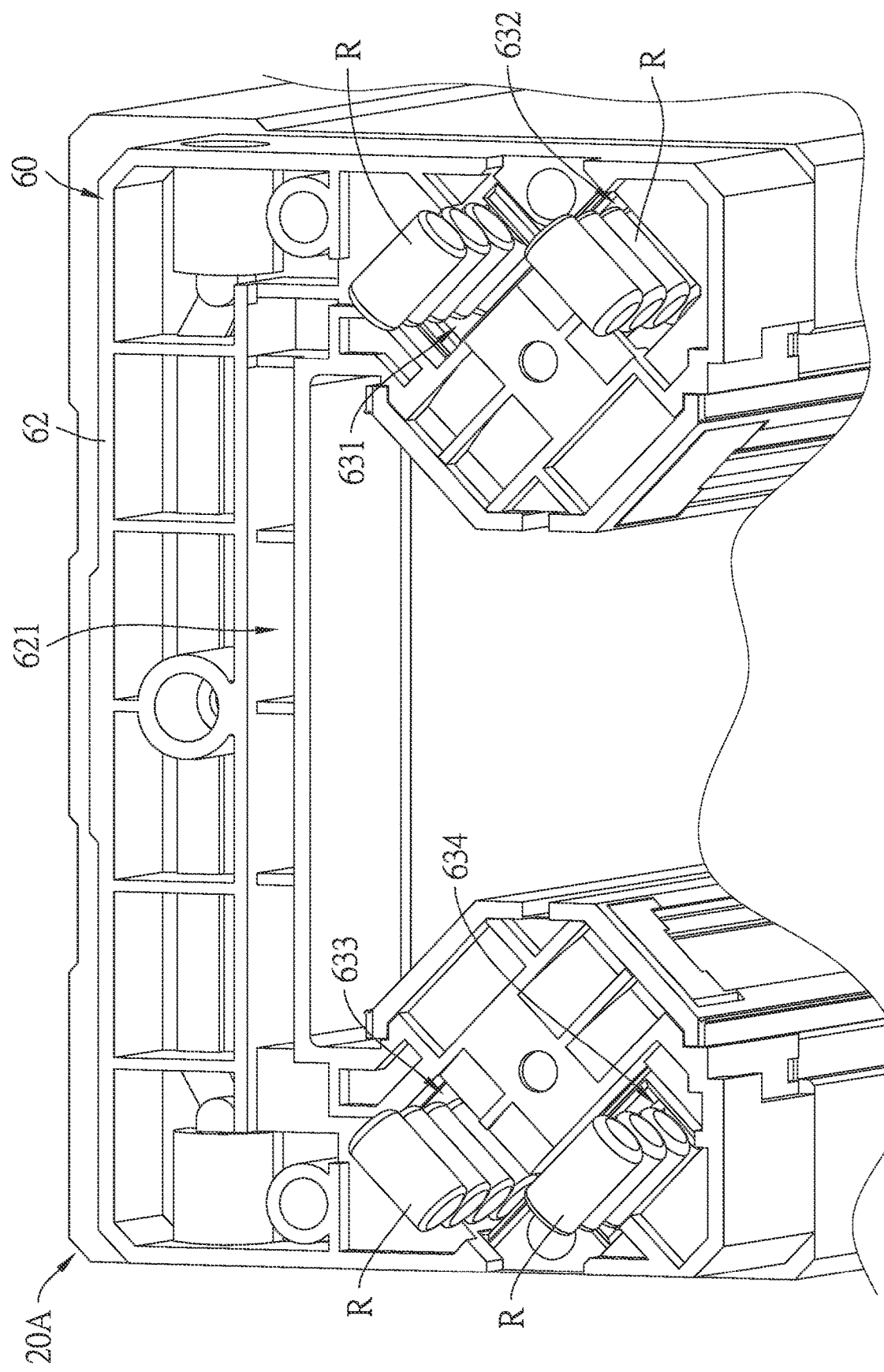
FIG. 12 is a schematic view of the invention showing the open end cover covers the first cover and the second cover.
Figure 13:
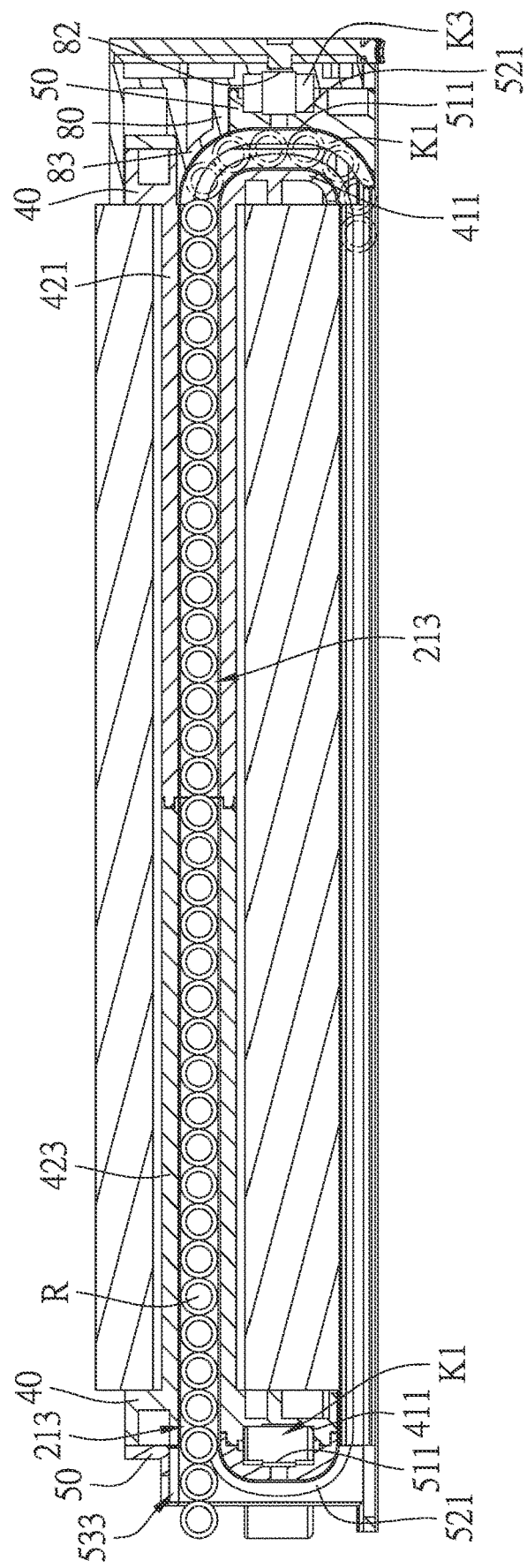
FIG. 13 is a cross-sectional view taken along line 13-13 in FIG. 11.
Figure 14:
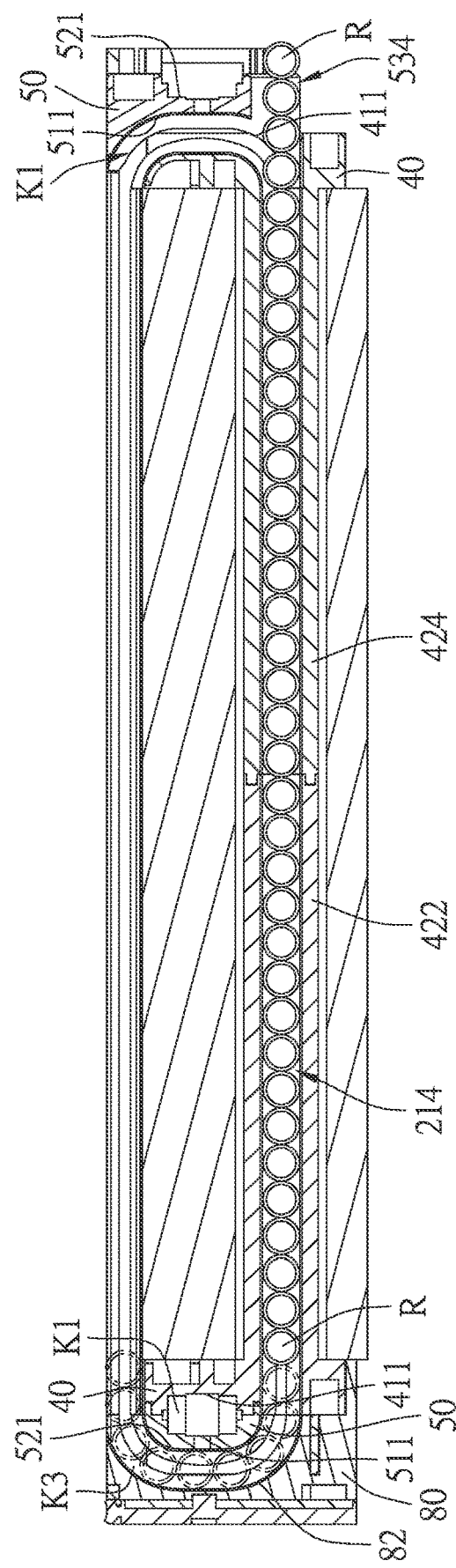
FIG. 14 is a cross-sectional view taken along line 14-14 in FIG. 11.

Please refer to FIG. 12, the through holes 63 of the open end covers 60, the holes 53 of the second cover plates 50, and the penetrating holes H of the first cover plates 40 are connected to the non-load passages 21. Therefore, the rolling elements R can be directly fed into the non-load passages 21 through the through holes 63, the holes 53, and the penetrating holes H, so that four rows of rolling elements R can be fed at the same time, without turning over or feeding the rolling elements R separately, which can greatly reduce assembly man-hours and increase the possibility of automation.

In addition, the invention can install the first cover plate 40 and the second cover plate 50 symmetrically on the first end 20A and the second end 20B of the sliding block 20, which is different from the design of the components of the conventional technology at the open-end and closed-end, which can save the cost of mold opening and improve the efficiency of automated assembly.

What is claimed is:

1. A roller-type linear guideway comprising:
   a rail;
   a sliding block slidably sleeved on the rail along a sliding direction and including a plurality of non-load passages, wherein the sliding block and the rail jointly form a plurality of load passages, and the sliding block defines a first end and a second end along the sliding direction;
   two end cover units disposed one at each end of the sliding block, wherein the two end cover units together with the plurality of non-load passages and the plurality of load passages form a plurality of circulation paths for a plurality of rolling elements to circulate, wherein at least one of the end cover units comprises:
   a first cover plate disposed on the sliding block and including a plurality of penetrating holes in communication with the non-load passages;
   a second cover plate disposed on a surface of the first cover plate facing away from the sliding block, a first turning path is formed between the second cover plate and the first cover plate and is in communication with one of the non-load passages and one of the load passages, and the second cover plate includes a plurality of holes which are respectively in communication with the penetrating holes of the first cover plate;
   an open end cover disposed at one end of the sliding block and located at one side of the second cover plate facing away from the first cover plate, a second turning path is formed between the open end cover and the second cover plate, an angle is formed between an extending direction of the second turning path and an extending direction of the first turning path, and the open end cover includes a plurality of through holes respectively communicating with the holes of the second cover plate; and
   an outer end cover is installed on the open end cover and closes the through holes.

2. The roller-type linear guideway as claimed in claim 1, wherein the extending direction of the second turning path is perpendicular to the extending direction of the first turning path.

3. The roller-type linear guideway as claimed in claim 1, wherein the other one of the end cover units comprises one said first cover plate, one said second cover plate, one said open end cover and one said outer end cover.

4. The roller-type linear guideway as claimed in claim 1, wherein the other one of the end cover units comprises one said first cover plate, one said second cover plate, and a closed end cover.

5. The roller-type linear guideway as claimed in claim 4, wherein the sliding block includes four rolling surfaces along the sliding direction, and the non-load passages run through the first end and the second end;
   a plurality of rolling grooves are formed on an outer peripheral surface of the rail, the rolling grooves and the rolling surfaces jointly form the load passages, and the number of the load passages and the non-load passages is four;
   one of the first cover plates is disposed at the first end of the sliding block, the other one of the first cover plates is disposed at the second end of the sliding block, the first cover plates each include a main body and four return pipes which are connected to the main body and in communication with the through holes, the main body includes an inner surface and an outer surface opposite to each other along the sliding direction, the return pipes are connected to the inner surface and respectively inserted into the non-load passages, and the outer surface of each main body includes two first turning portions;
   each of the second cover plates is disposed on the outer surface of a corresponding one of the first cover plates, and each of the second cover plates includes an inner corresponding side and an outer corresponding side opposite to each other along the sliding direction, each of the inner corresponding sides includes two first turning surfaces, each of the first turning surfaces faces a corresponding one of the first turning portions to form one said first turning path, each of the outer corresponding sides includes two second turning portions, and the number of the holes of each of the second cover plates is four; and
   the open end cover is located at the first end of the sliding block, the open end cover includes a first side facing one of the second cover plates, the first side includes two second turning surfaces, each of the second turning surfaces faces a corresponding one of the second turning portions to form the second turning path.

6. The roller-type linear guideway as claimed in claim 5, wherein the non-load passages are defined as a first non-load passage, a second non-load passage, a third non-load passage, and a fourth non-load passage; the load passages are defined as a first load passage, a second load passage, a third load passage, and a fourth load passage;

the return pipes are defined as a first return pipe, a second return pipe, a third return pipe, and a fourth return pipe, the first return pipe of the first cover plate at the first end is inserted into the first non-load passage, the second return pipe of the first cover plate at the first end is inserted in the second non-load passage, the third return pipe of the first cover plate at the first end is inserted in the third non-load passage, the fourth return pipe of the first cover plate at the first end is inserted in the fourth non-load passage, the first return pipe of the first cover plate at the second end is inserted into the third non-load passage, the second return pipe of the first cover plate at the second end is inserted into the fourth non-load passage, the third return pipe of the first cover plate at the second end is inserted into the first non-load passage, and the fourth return pipe of the first cover plate at the second end is inserted into the second non-load passage;

the number of the first turning paths at the first end is two, one of the first turning paths at the first end is connected to the first non-load passage and the second load passage, and the other of the first turning paths at the first end is connected to the fourth non-load passage and the third load passage, the number of the first turning paths at the second end is two, one of the first turning paths at the second end is connected to the second non-load passage and the first load passage, and the other of the first turning paths at the second end is connected to the third non-load passage and the fourth load passage;

the number of the second turning paths is two, one of the second turning paths is connected to the second non-load passage and the first load passage, and the other second turning path is connected to the third non-load passage and the fourth load passage.

7. The roller-type linear guideway as claimed in claim 5, wherein the first turning surfaces and the first turning portions extend along a first turning direction, the second turning surfaces and the second turning portions extend along a second turning direction, and the first turning direction is perpendicular to the second turning direction.

8. The roller-type linear guideway as claimed in claim 5, wherein the closed end cover is located at the second end of the sliding block, the closed end cover includes a closed inner surface facing the second cover plate at the second end of the sliding block, the closed inner surface includes two curved portions and two closed convex portions, the curved portions face the second turning portions to form two third turning paths, one of the two third turning paths is connected to the first non-load passage and the second load passage, the other third turning path is connected to the fourth non-load passage and the third load passage, and the closed convex portions close the holes.

9. The roller-type linear guideway as claimed in claim 5, wherein the outer end cover includes four shielding portions for closing the through holes, respectively, the shielding portions extend along the sliding direction, the shielding portions are divided into two first shielding portions and two second shielding portions, a length of each of the first shielding portions along the sliding direction is greater than a length of each of the second shielding portions along the sliding direction, each of the shielding portions includes a guide surface, the guide surfaces are arc surfaces and provided for guiding the rolling elements to change moving directions, the guide surface of each of the two first shielding portions is a first guide surface, the first guide surfaces are side walls of the first turning paths, the guide surface of each of the two second shielding portions is a second guide surface, and the second guide surfaces are side walls of the second turning paths.

10. The roller-type linear guideway as claimed in claim 9, wherein the open end cover includes a first side and a second side opposite to each other, the second side includes an accommodating groove, a connecting portion is connected between two of the four shielding portions and the other two of the four shielding portions, and the connecting portion is accommodated in the accommodating groove.

\* \* \* \* \*